US012773665B2

(12) United States Patent
Imamura

(10) Patent No.: US 12,773,665 B2
(45) Date of Patent: Oct. 27, 2026

(54) TREATMENT DEVICE FOR SEMICONDUCTOR MANUFACTURING EXHAUST GAS

(71) Applicant: KANKEN TECHNO CO., LTD., Kyoto (JP)

(72) Inventor: Hiroshi Imamura, Kyoto (JP)

(73) Assignee: KANKEN TECHNO CO., LTD., Kyoto (JP)

(*) Notice: Subject to any disclaimer, the term of this patent is extended or adjusted under 35 U.S.C. 154(b) by 714 days.

(21) Appl. No.: 18/274,277

(22) PCT Filed: Apr. 26, 2021

(86) PCT No.: PCT/JP2021/016592
§ 371 (c)(1),
(2) Date: Jul. 26, 2023

(87) PCT Pub. No.: WO2022/208901
PCT Pub. Date: Oct. 6, 2022

(65) Prior Publication Data
US 2024/0082782 A1 Mar. 14, 2024

(30) Foreign Application Priority Data
Apr. 1, 2021 (WO) .................. PCT/JP2021/014176

(51) Int. Cl.
*B01D 53/70* (2006.01)
*B01D 47/06* (2006.01)
*B01D 53/76* (2006.01)

(52) U.S. Cl.
CPC ............. *B01D 53/70* (2013.01); *B01D 47/06* (2013.01); *B01D 53/76* (2013.01);
(Continued)

(58) Field of Classification Search
CPC ...... B01D 47/06; B01D 47/12; B01D 53/005; B01D 53/56; B01D 53/68; B01D 53/70;
(Continued)

(56) References Cited

U.S. PATENT DOCUMENTS 6,423,284 B1 * 7/2002 Arno ...................... B01D 53/70 423/240 R
7,695,700 B2 * 4/2010 Holst ................. B01D 53/1456 423/240 R (Continued)

FOREIGN PATENT DOCUMENTS

JP 2000-024447 A 1/2000
JP 2002-106812 A 4/2002

(Continued)

OTHER PUBLICATIONS

International Search Report mailed Jun. 8, 2021, for the corresponding patent application No. PCT/JP2021/016592, with English translation.

(Continued)

*Primary Examiner* — Dapinder Singh
(74) *Attorney, Agent, or Firm* — LUCAS & MERCANTI, LLP

(57) ABSTRACT

A treatment device for semiconductor manufacturing exhaust gas of the present invention includes an inlet scrubber, a gas treatment furnace, and an outlet scrubber. The gas treatment furnace includes an outer cylinder having a main body that includes a gas treatment space formed therein and a gas introduction port drilled in a bottom thereof, an inner cylinder that extends across the gas treatment space such that one end thereof is mounted to the bottom inside the main body so as to enclose the gas introduction port and another end thereof is opened and located at a position close to a ceiling surface of the main body, and an electric heater that is hung from a ceiling of the main body and that has a (Continued)

heating element having a long bar shape placed in an internal space of the inner cylinder.

3 Claims, 1 Drawing Sheet

(52) U.S. Cl.
CPC .................. *B01D 2251/202* (2013.01); *B01D 2251/2062* (2013.01); *B01D 2257/2066* (2013.01); *B01D 2258/0216* (2013.01)

(58) Field of Classification Search
CPC ........ B01D 53/75; B01D 53/76; B01D 53/78; B01D 2251/202; B01D 2251/2062; B01D 2257/2066; B01D 2258/0216; Y02C 20/10; Y02C 20/30; Y02P 20/155
See application file for complete search history.

(56) References Cited

U.S. PATENT DOCUMENTS

| | | | | |
|---|---|---|---|---|
| 9,937,467 | B2 * | 4/2018 | Kaneshiro | B01D 53/76 |
| 2006/0065120 | A1 * | 3/2006 | Clements | B01D 53/68 95/233 |
| 2007/0166205 | A1 * | 7/2007 | Holst | B01D 47/06 422/169 |
| 2018/0326352 | A1 * | 11/2018 | Davidian | C01B 3/02 |

FOREIGN PATENT DOCUMENTS

| | | | |
|---|---|---|---|
| JP | 2002-188810 | A | 7/2002 |
| JP | 2004-174391 | A | 6/2004 |
| JP | 2004-278879 | A | 10/2004 |
| JP | 2005-218911 | A | 8/2005 |
| JP | 2006-150281 | A | 6/2006 |
| JP | 2007-054720 | A | 3/2007 |
| JP | 2007-059061 | A | 3/2007 |
| JP | 2007-061754 | A | 3/2007 |
| JP | 2009-082892 | A | 4/2009 |
| KR | 2009-0011467 | A | 2/2009 |
| TW | 201915310 | A | 4/2019 |

OTHER PUBLICATIONS

Taiwanese Office Action dated Jun. 24, 2022 for the corresponding Taiwanese Patent Application No. 110133589, with machine English translation.
Taiwanese Office Action dated Mar. 21, 2023 for the corresponding Taiwanese Patent Application No. 110133589, with machine English translation.
Japanese Office Action dated Oct. 5, 2021 for the corresponding Japanese Patent Application No. 2021-540441, with machine English translation.
Chinese Office Action dated Jun. 7, 2023 for the corresponding Chinese Patent Application No. 202180003384.0, with machine English translation.
International Search Report mailed Jun. 8, 2021, for the corresponding patent application No. PCT/JP2021/014176, with English translation.

* cited by examiner

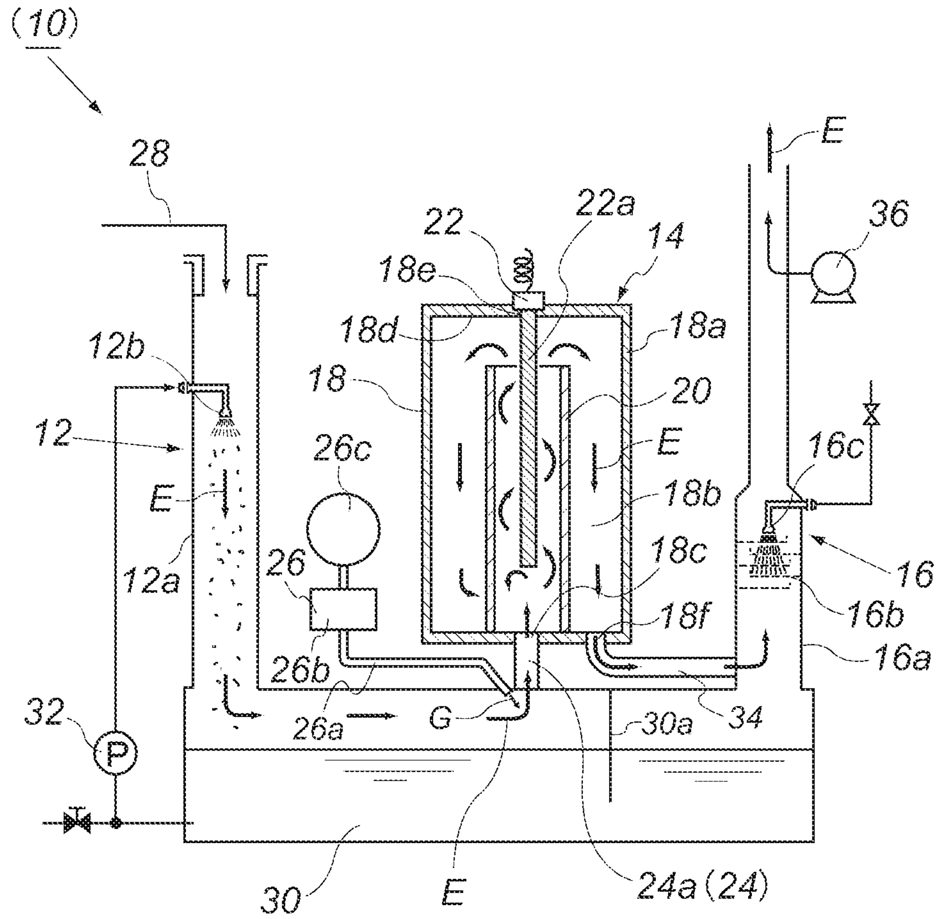
(10)
28
22
22a
14
18e
18d
18a
12b
18
20
12
26c
E
16c
E
18b
12a
26
18c
16
16b
18f
26b
16a
32
G
26a
30a
34
30
E
24a (24)
36
E

TREATMENT DEVICE FOR SEMICONDUCTOR MANUFACTURING EXHAUST GAS

CROSS REFERENCE TO RELATED APPLICATION

This Application is a 371 of PCT/JP2021/016592 filed on Apr. 26, 2021, which claimed priority of International Application No. PCT/JP2021/014176 filed on Apr. 1, 2021, both of which are incorporated herein by reference.

TECHNICAL FIELD

The present invention relates to a treatment device suitable for an abatement process of a hardly decomposable semiconductor manufacturing exhaust gas including perfluoro compounds (PFCs), $N_2O$, and the like.

BACKGROUND ART

In a manufacturing process for a semiconductor device or a liquid crystal display, gases of various kinds of fluorine compounds are used as a cleaning gas, an etching gas, and the like. Such fluorine compounds are referred to as "PFCs", and typical examples thereof include: perfluorocarbons such as $CF_4$, $C_2F_6$, $C_3F_8$, $C_4F_8$, and $C_5F_8$; hydrofluorocarbons such as $CHF_3$; and inorganic fluorine-containing compounds such as $SF_6$ and $NF_3$. In the manufacturing process for a semiconductor device, etc., as a material gas for producing a nitride film, $N_2O$ (nitrous oxide) and the like are used. Various kinds of PFCs, $N_2O$, and the like used in the manufacturing process for a semiconductor device or a liquid crystal display are exhausted as an exhaust gas together with $N_2$, Ar, and the like used as, for example, a carrier gas and a purge gas. Throughout the present description, this exhaust gas is referred to as "semiconductor manufacturing exhaust gas", or simply referred to as "exhaust gas". In addition, a manufacturing process for a semiconductor device and a manufacturing process for a liquid crystal display are collectively referred to as "semiconductor manufacturing process".

Here, a proportion of PFCs, $N_2O$, and the like in the entire exhaust gas is small compared to that of other gases such as $N_2$ and Ar. However, the global warming potential (GWP) of PFCs, $N_2O$, and the like is as large as several thousands to several tens of thousands of times that of $CO_2$, and the atmospheric lifetime thereof is also as long as several thousands to several tens of thousands of years compared to that of $CO_2$. Therefore, devastating effects are caused, even if a small amount of the gas is discharged to the atmosphere. Furthermore, perfluorocarbons represented by $CF_4$ and $C_2F_6$ are stable when it comes to a C—F bond (a bond energy thereof is as large as 130 kcal/mol), and thus decomposition thereof is known to not be easy. Accordingly, various technologies have been developed to abate used PFCs, $N_2O$, and the like from an exhaust gas.

As a technology for abating the exhaust gas that includes hardly decomposable PFCs, $N_2O$, and the like, Patent Literature 1 (Japanese Laid-Open Patent Publication No. 2002-188810) below discloses an exhaust gas treatment device in which dust and the like included in a noxious exhaust gas is eliminated by an inlet scrubber, then the exhaust gas is thermally decomposed in an exhaust gas treatment tower provided with an electric heater, and the decomposed gas is abated through gas-liquid contact in a wet outlet scrubber, for example.

CITATION LIST

Patent Literature

[PTL 1] Japanese Laid-Open Patent Publication No. 2002-188810

SUMMARY OF INVENTION

Technical Problem

However, the above conventional art has the following problems. Specifically, when PFCs in an exhaust gas contain hardly decomposable $CF_4$ as a main component, an electric heater has to be used at a very high temperature, for example, 1500° C. or more. However, the use in such a temperature range is close to the limit in terms of the physical property of the heating element material of the electric heater, and thus there is a problem that it is difficult to continuously operate the electric heater for a long time.

"The 2030 Agenda for Sustainable Development" was adopted in the United Nations Summit in September 2015. After that, various discussions and investigations about, for example, efficient use of energy in future have been conducted. Under these circumstances, also, regarding the above conventional exhaust gas treatment device that includes an electric heater and that consumes a relatively large amount of power as energy during heating, it is easily estimated that the needs for high efficiency and energy saving brought about by such high efficiency are growing.

Therefore, a main object of the present invention is to provide a treatment device for semiconductor manufacturing exhaust gas that can more efficiently utilize electric power energy and can remarkably improve efficiency of abating a semiconductor manufacturing exhaust gas containing $CF_4$, which is the most hardly decomposable PFC, as a main component, while maintaining advantages of the conventional exhaust gas treatment device using an electric heater as they are.

Solution to Problem

In order to achieve the above object, the present invention is directed to a treatment device 10 for semiconductor manufacturing exhaust gas having the following configuration, for example, as shown in FIG. 1.

Specifically, the treatment device 10 includes: an inlet scrubber 12 for washing, with liquid, an exhaust gas E exhausted through a semiconductor manufacturing process; a gas treatment furnace 14 for thermally decomposing the exhaust gas E that has passed through the inlet scrubber 12; and an outlet scrubber 16 for washing, with liquid, the exhaust gas E thermally decomposed by the gas treatment furnace 14. Among these, the gas treatment furnace 14 includes: an outer cylinder 18 having a sealed cylindrical main body **18*a* that includes a gas treatment space 18*b* formed therein and a gas introduction port 18*c* drilled in a bottom thereof; an inner cylinder 20 that extends across the gas treatment space 18*b* such that one end thereof is mounted to the bottom inside the main body 18*a* so as to enclose the gas introduction port 18*c* and another end thereof is opened and located at a position close to a ceiling surface of the main body 18*a*; and an electric heater 22 that is hung from a ceiling 18*d* of the main body 18*a* and that has a heating element 22*a* having a long bar shape placed in an internal space of the inner cylinder 20. In front of the gas introduction port 18*c*, a decrease part 24 for decreasing, at once, an inner diameter of a passage for the exhaust gas E that has passed through the inlet scrubber 12, to a diameter not greater than a diameter of the gas introduction port 18***c* is provided. Furthermore, in front of the gas introduction port 18*c*, reducing gas supply means 26 for supplying a predetermined amount of reducing gas G toward the exhaust gas E is provided in the vicinity of an end on an upstream side in an exhaust gas flowing direction of the decrease part 24.

The present invention exhibits, for example, the following effects.

When the reducing gas G, which is supplied from the reducing gas supply means 26 to the exhaust gas E washed with liquid that has passed through the inlet scrubber 12, passes through the decrease part 24, a flow speed thereof is increased and, at the same time, the contact opportunity thereof with PFCs, $N_2O$, and the like, which are abatement (thermal decomposition) target components in the exhaust gas E, increases. Subsequently, the exhaust gas E and the reducing gas G supplied into the gas treatment furnace 14 through the gas introduction port 18*c* while having the increased flow speed collide with the heating element 22*a* of the electric heater 22 placed in the inner cylinder 20 to produce turbulent flow, thereby further increasing the contact opportunity of the reducing gas G with PFCs, $N_2O$, and the like in the exhaust gas E. The action of the radicalized reducing gas G is enhanced by being heated in this state, so that PFCs, $N_2O$, and the like in the exhaust gas E are thermally decomposed very efficiently. The high-temperature exhaust gas E thermally decomposed as above is to flow down outside the inner cylinder 20. At this time, a heat-insulating effect can be exerted so as to prevent the temperature inside the inner cylinder 20 from being lowered.

With the above-described synergistic action, 99.9% or more of $CF_4$, which is the most hardly decomposable PFC, can be decomposed at a heating temperature lower than before, for example, 1250° C. to 1350° C.

In the present invention, when the exhaust gas E contains PFCs, a flow rate of the reducing gas G to be supplied by the reducing gas supply means 26 is preferably at a proportion of 0.1 to 5 parts by volume with respect to 100 parts by volume of a flow rate of the exhaust gas E to be supplied to the gas treatment furnace 14.

If the flow rate of the reducing gas G to be supplied is less than 0.1 parts by volume with respect to 100 parts by volume of the flow rate of the exhaust gas E to be supplied to the gas treatment furnace 14, the addition effect of the reducing gas G is not sufficiently exerted. On the contrary, if the flow rate of the reducing gas G to be supplied is more than 5 parts by volume with respect to 100 parts by volume of the flow rate of the exhaust gas E to be supplied to the gas treatment furnace 14, the addition effect of the reducing gas G is sufficiently exerted but the effect peaks, resulting in wastefully burning the reducing gas G. Thus, a proportion of the reducing gas G that is added to the exhaust gas E to be supplied to the gas treatment furnace 14 is set within the above range, whereby a thermal decomposition efficiency of PFCs in the exhaust gas E due to addition of the reducing gas G can be maximized.

In the present invention, the reducing gas G is preferably hydrogen or ammonia.

In this case, the amount of carbon dioxide to be discharged to the atmosphere after thermal decomposition of the exhaust gas E can be reduced. When an abatement-target component in the exhaust gas E contains $N_2O$, the amount of NOx (nitrogen oxide) to be discharged after thermal decomposition of the $N_2O$ can be remarkably reduced.

Advantageous Effects of Invention

According to the present invention, a treatment device for semiconductor manufacturing exhaust gas that can more efficiently utilize electric power energy and can remarkably improve efficiency of abating a semiconductor manufacturing exhaust gas containing $CF_4$, which is the most hardly decomposable PFC, as a main component, while maintaining advantages of the conventional exhaust gas treatment device using an electric heater as they are, can be provided.

BRIEF DESCRIPTION OF DRAWINGS

FIG. 1 is a sectional view schematically showing one example of a treatment device for semiconductor manufacturing exhaust gas according to an embodiment of the present invention.

DESCRIPTION OF EMBODIMENTS

Hereinafter, an embodiment of a treatment device for semiconductor manufacturing exhaust gas, according to the present invention, will be described with reference to the drawing.

FIG. 1 is a sectional view schematically showing one example of a treatment device 10 for semiconductor manufacturing exhaust gas according to one embodiment of the present invention. The treatment device 10 for semiconductor manufacturing exhaust gas is a device that thermally decomposes an exhaust gas E containing PFCs, $N_2O$, and the like exhausted from an exhaust source (through a semiconductor manufacturing process), which is not shown, to perform an abatement process, and generally includes an inlet scrubber 12, a gas treatment furnace 14, and an outlet scrubber 16.

The inlet scrubber 12 is a wet scrubber that eliminates dust, water-soluble components, and the like contained in the exhaust gas E to be introduced into the gas treatment furnace 14. In the present embodiment, the inlet scrubber 12 includes a straight tube type scrubber body 12*a*, and a spray nozzle 12*b* that is installed in the vicinity of the top of the scrubber body 12*a* inside the scrubber body 12*a* and that sprays a chemical liquid such as water in an atomized state. The inlet scrubber 12 communicates with an exhaust gas generation source (not shown) such as a semiconductor manufacturing apparatus via an exhaust gas duct 28.

In addition, the inlet scrubber 12 is installed so as to stand on a chemical liquid tank 30 (see FIG. 1), or is placed separately from the chemical liquid tank 30 and is connected to the chemical liquid tank 30 via piping (not shown) to deliver drainage to the chemical liquid tank 30. A circulation pump 32 is installed between the spray nozzle 12*b* and the chemical liquid tank 30 so as to raise the chemical liquid stored in the chemical liquid tank 30 up to the spray nozzle 12*b*.

In the present embodiment shown in FIG. 1, not only drainage from the inlet scrubber 12 but also the exhaust gas E washed with liquid are allowed to be delivered to the chemical liquid tank 30, and a space (upper space) between a liquid surface and a ceiling surface of the chemical liquid tank 30 is utilized as an exhaust gas passage. Here, a sign 30*a* in FIG. 1 denotes a "partition wall" serving as division so as to prevent the exhaust gas E washed with liquid by the inlet scrubber 12 from flowing into the outlet scrubber 16 without passing through the gas treatment furnace 14.

The gas treatment furnace 14 is a device that thermally decomposes PFCs, $N_2O$, and the like in the exhaust gas E by using an electric heater 22, and generally includes an outer cylinder 18, an inner cylinder 20, and the electric heater 22.

The outer cylinder 18 or at least an inner surface thereof is made of a refractory material such as a castable refractory material, and has a sealed circular cylindrical main body 18*a* including a gas treatment space 18*b* formed therein. As shown in FIG. 1, when being used, the main body 18*a* is installed so as to stand such that a plane portion (of the main body 18*a*) faces the top-and-bottom direction, and a gas introduction port 18*c* is drilled in the bottom thereof. An insertion opening 18*e* for inserting the electric heater 22 is drilled at a position, opposed to the gas introduction port 18*c*, in the ceiling 18*d* of the main body 18*a*.

Although the outer cylinder 18 is formed in a sealed circular cylindrical shape in the present embodiment, the shape of the outer cylinder 18 may be formed in any shape as long as the outer cylinder 18 has a cylindrical shape having both ends sealed, for example, a sealed quadrangular cylindrical shape or the like.

In the illustrated embodiment, the gas introduction port 18*c* is drilled at the center of the bottom of the main body 18*a*, and a gas exhaust port 18*f* for exhausting the exhaust gas E thermally decomposed in the gas treatment space 18*b* inside the main body 18*a* is drilled at a position close to the gas introduction port 18*c* in the bottom of the main body 18*a*.

The inner cylinder 20 is formed of a refractory material such as a castable refractory material, a metal material such as Hastelloy (registered trademark of Haynes International) or stainless steel, or the like, and is a circular cylindrical member having both ends opened in the longitudinal direction thereof. One end of the inner cylinder 20 in the longitudinal direction is mounted to the bottom inside the main body 18*a* of the outer cylinder 18 so as to enclose the gas introduction port 18*c*. The inner cylinder 20 extends across the gas treatment space 18*b* of the outer cylinder 18, and the other end thereof in the longitudinal direction is located at a position close to a ceiling surface of the main body 18*a* of the outer cylinder 18.

Although the inner cylinder 20 is formed in a circular cylindrical shape in the present embodiment, the shape of the inner cylinder 20 may be any shape as long as the inner cylinder 20 has a cylindrical shape having both ends opened, for example, a quadrangular cylindrical shape or the like.

The electric heater 22 is a heat source for heating the gas treatment space 18*b* inside the gas treatment furnace 14, and has a heating element 22*a* having a long bar shape. As the heating element 22*a*, an element that has corrosion resistance to HF (hydrogen fluoride) produced as a byproduct by thermally decomposing PFCs in the exhaust gas E to be treated, and can generate heat at high temperatures is used. Specifically, examples thereof include ceramic materials such as silicon carbide (SiC), molybdenum disilicide ($MoSi_2$), and lanthanum chromite ($LaCrO_3$), and materials formed by helically winding a metal wire such as a nichrome wire or Kanthal (registered trademark of Sandvik AB) wire, which is a heating resistor, inside a protective pipe made of ceramic such as alumina or metal such as Hastelloy (registered trademark of Haynes International).

The heating element 22*a* is inserted in an internal space of the main body 18*a* through the insertion opening 18*e* provided at a predetermined position in the ceiling 18*d* of the outer cylinder 4, whereby the electric heater 22 is detachably mounted. Accordingly, the electric heater 22 is hung from the ceiling 18*d* of the main body 18*a* of the outer cylinder 18, and the heating element 22*a* having a long bar shape is placed in the internal space of the inner cylinder 20.

Although not shown, temperature measurement means such as a thermocouple for detecting the temperature of the gas treatment space 18*b* is mounted in the gas treatment furnace 14 configured as above, for example, and temperature data (temperature signal) detected by the temperature measurement means is provided via a signal line to control means including a central processing unit (CPU), a memory, an input device, a display device, etc. A power supply unit, etc., which is not shown, is also connected to the control means.

While the gas treatment furnace 14 configured as above is placed on the upper side of the chemical liquid tank 30, an upper end of a short pipe 24*a* having an inner diameter almost the same as that of the gas introduction port 18*c* is communicably connected to the gas introduction port 18*c*, and a lower end of the short pipe 24*a* is communicably connected to a region where the exhaust gas E having passed through the inlet scrubber 12 flows in the chemical liquid tank 30. Accordingly, the short pipe 24*a* functions as a “decrease part 24” for decreasing, at once, the inner diameter of the passage for the exhaust gas E that has passed through the inlet scrubber 12, to a diameter not greater than the diameter of the gas introduction port 18*c*.

In the vicinity of a part to which the short pipe 24*a* is connected in a ceiling of the chemical liquid tank 30, i.e., in the vicinity of an end on an upstream side in an exhaust gas flowing direction of the decrease part 24, reducing gas supply means 26 for supplying a predetermined amount of reducing gas G toward the exhaust gas E to be supplied into the gas treatment furnace 14 via the decrease part 24 is provided.

The reducing gas supply means 26 includes: a reducing gas supply pipe 26*a* having a tip that communicates with the internal space of the chemical liquid tank 30 in the vicinity of the part to which the short pipe 24*a* is connected in the ceiling of the chemical liquid tank 30, and a base end that is connected to a storage source 26*c*, such as a tank or a cylinder, for storing the reducing gas G; flow rate adjustment means 26*b* that is provided on the reducing gas supply pipe 26*a* and that adjusts the amount of the reducing gas G to be supplied into the chemical liquid tank 30; and the like.

Examples of the reducing gas G to be supplied by the reducing gas supply means 26 include hydrogen, carbon monoxide, ammonia, and hydrocarbon, and when hydrogen or ammonia is used as the reducing gas G among these, the amount of carbon dioxide to be discharged to the atmosphere after thermal decomposition of the exhaust gas E can be reduced. When an abatement-target component in the exhaust gas E contains $N_2O$, the amount of NOx to be discharged after thermal decomposition of $N_2O$ can also be remarkably reduced by supplying hydrogen or ammonia the amount of which is almost the same as that of the $N_2O$.

When a hydrocarbon such as $CH_4$ (methane) is, for example, used as the reducing gas G, initial cost and running cost of the entire treatment device 10 for an exhaust gas containing PFCs can be reduced.

Here, when the exhaust gas E contains PFCs, a flow rate of the reducing gas G to be supplied from the reducing gas supply means 26 is, for example, 0.2 to 10 liters/minute with respect to a flow rate of the exhaust gas E to be supplied to the gas treatment furnace 14 being 200 liters/minute, and specifically, the flow rate of the reducing gas G is preferably at a proportion of 0.1 to 5 parts by volume with respect to 100 parts by volume of the flow rate of the exhaust gas E to be supplied to the gas treatment furnace 14, and more preferably within a range of 0.5 to 2.5 parts by volume.

When ammonia is used as the reducing gas G, urea or urea aqueous may be used as the supply source.

The outlet scrubber 16 is a wet scrubber that cools the thermally decomposed exhaust gas E that has passed through the gas treatment furnace 14 and that finally eliminates dust, water-soluble components, and the like produced as a byproduct through thermal decomposition, from the exhaust gas E. In the present embodiment, the outlet scrubber 16 includes: a straight tube type scrubber body 16*a* that communicates, via the exhaust pipe 34, with the gas exhaust port 18*f* provided in the bottom of the main body 18*a* of the gas treatment furnace 14; a plurality of perforated plates 16*b* (four perforated plates 16*b* in the present embodiment) installed so as to be spaced from each other in the vertical direction in the scrubber body 16*a*; and a downward-oriented spray nozzle 16*c* that is mounted right above the perforated plate 16*b* arranged at the top and sprays a chemical liquid such as water from the upper side in the direction opposite to the flowing direction of the exhaust gas E. The outlet scrubber 16 is installed so as to stand on the chemical liquid tank 30, so that the discharged water is delivered to the chemical liquid tank 30.

In the outlet scrubber 16 of the present embodiment, unlike the above-described inlet scrubber 12, a new chemical liquid such as clean water is supplied to the spray nozzle 16*c* (see FIG. 1), but the spray nozzle 16*c* may be communicably connected to an ejection side of the circulation pump 42 so as to raise the chemical liquid stored in the chemical liquid tank 30 up to the spray nozzle 16*c*.

An exhaust fan 36 for discharging the treated exhaust gas E to the atmosphere is connected at an outlet of the outlet scrubber 16.

Corrosion-resistant lining or coating is applied, using vinyl chloride, polyethylene, unsaturated polyester resin, fluororesin, or the like, to parts other than the gas treatment furnace 14 of the treatment device 10 for semiconductor manufacturing exhaust gas according to the present embodiment, to protect each part from corrosion due to corrosive components such as hydrofluoric acid contained in the exhaust gas E or produced by thermal decomposition of the exhaust gas E.

Further, when the exhaust gas E is abated using the treatment device 10 for semiconductor manufacturing exhaust gas configured as above, an operation switch (not shown) of the treatment device 10 is firstly turned on to operate the gas treatment furnace 14 and the electric heater 22, thereby starting heating the gas treatment space 18*b* in the gas treatment furnace 14.

When the temperature inside the gas treatment space 18*b* reaches a predetermined temperature, in a range of 800° C. to 1400° C., corresponding to the type of the exhaust gas E to be treated, the exhaust fan 36 operates to start introduction of the exhaust gas E into the treatment device 10. Then, the exhaust gas E passes through the inlet scrubber 12, the gas treatment furnace 14, and the outlet scrubber 16 in this order, to abate abatement-target components (i.e., PFCs, $N_2O$, and the like) in the exhaust gas E. In addition, the control means, which is not shown, controls the amount of power to be supplied to the electric heater 22 of the gas treatment furnace 14 so as to maintain a predetermined temperature inside the gas treatment space 18*b*.

In the treatment device 10 for semiconductor manufacturing exhaust gas according to the present embodiment, when the reducing gas G, which is supplied from the reducing gas supply means 26 to the exhaust gas E washed with liquid that has passed through the inlet scrubber 12, passes through the decrease part 24, a flow speed thereof is increased and at the same time the contact opportunity thereof with PFCs, $N_2O$, and the like, which are abatement (thermal decomposition) target components in the exhaust gas E, increases. Subsequently, the exhaust gas E and the reducing gas G supplied into the gas treatment furnace 14 through the gas introduction port 18*c* while having the increased flow speed collide with the heating element 22*a* of the electric heater 22 placed in the inner cylinder 20 to produce turbulent flow, thereby further increasing the contact opportunity of the reducing gas G with PFCs, $N_2O$, and the like in the exhaust gas E. The action of the radicalized reducing gas G is enhanced by being heated in this state by the electric heater 22 in the inner cylinder 20, so that PFCs, $N_2O$, and the like in the exhaust gas E are thermally decomposed very efficiently. The high-temperature exhaust gas E thermally decomposed as above is to flow down outside the inner cylinder 20. At this time, a heat-insulating effect can be exerted so as to prevent the temperature inside the inner cylinder 20 from being lowered.

With the above-described synergistic action, 99.9% or more of $CF_4$, which is the most hardly decomposable PFC, can be decomposed at a heating temperature lower than before, for example, 1250° C. to 1350° C.

In the above-described embodiment, the gas introduction port 18*c* provided in the outer cylinder 18 of the gas treatment furnace 14 communicates, via the short pipe 24*a*, with the upper space where the exhaust gas E washed with liquid by the inlet scrubber 12 flows in the chemical liquid tank 30. However, instead of using the short pipe 24*a*, the gas introduction port 18*c* of the outer cylinder 18 and the upper space of the chemical liquid tank 30 may be directly connected. In this case, an edge itself, on the front side in the gas flowing direction, of the gas introduction port 18*c* of the outer cylinder 18 functions as the decrease part 24.

In the above-described embodiment, when the gas introduction port 18*c* of the gas treatment furnace 14 communicates, via the short pipe 24*a*, with the upper space (passage for the exhaust gas washed with liquid) of the chemical liquid tank 30, it is preferable that a heat exchanger (not shown) is provided between the short pipe 24*a* and the exhaust pipe 34, i.e., the exhaust heat of the exhaust gas E that flows through the exhaust pipe 34 is supplied to the exhaust gas E that flows through the short pipe 24*a*, to preheat the exhaust gas E. In this case, it is possible to more efficiently utilize energy.

REFERENCE SIGNS LIST

- 10 treatment device for semiconductor manufacturing exhaust gas
- 12 inlet scrubber
- 14 gas treatment furnace
- 16 outlet scrubber
- 18 outer cylinder
- 18*a* main body
- 18*b* gas treatment space
- 18*c* gas introduction port
- 18*d* ceiling
- 20 inner cylinder
- 22 electric heater
- 22*a* heating element
- 24 decrease part
- 26 reducing gas supply means
- E exhaust gas
- G reducing gas

The invention claimed is:

1. A treatment device for semiconductor manufacturing exhaust gas, comprising:

an inlet scrubber for washing, with liquid, an exhaust gas exhausted through a semiconductor manufacturing process;

a gas treatment furnace for thermally decomposing the exhaust gas that has passed through the inlet scrubber; and an outlet scrubber for washing, with liquid, the exhaust gas thermally decomposed by the gas treatment furnace, wherein the gas treatment furnace includes:

an outer cylinder having a sealed cylindrical main body that includes a gas treatment space formed therein and a gas introduction port drilled in a bottom thereof;

an inner cylinder that extends across the gas treatment space such that one end thereof is mounted to the bottom inside the main body so as to enclose the gas introduction port and another end thereof is opened and located at a position close to a ceiling surface of the main body; and an electric heater that is hung from a ceiling of the main body and that has a heating element having a long bar shape placed in an internal space of the inner cylinder, and in front of the gas introduction port, a decrease part for decreasing, at once, an inner diameter of a passage for the exhaust gas that has passed through the inlet scrubber, to a diameter not greater than a diameter of the gas introduction port is provided, and reducing gas supply means for supplying a predetermined amount of reducing gas toward the exhaust gas is provided in the vicinity of an end on an upstream side in an exhaust gas flowing direction of the decrease part.

2. The treatment device for semiconductor manufacturing exhaust gas according to claim 1, wherein when the exhaust gas contains PFCs, a flow rate of the reducing gas to be supplied by the reducing gas supply means is at a proportion of 0.1 to 5 parts by volume with respect to 100 parts by volume of a flow rate of the exhaust gas to be supplied to the gas treatment furnace.

3. The treatment device for semiconductor manufacturing exhaust gas according to claim 1, wherein the reducing gas is hydrogen or ammonia.

* * * * *